Aug. 26, 1941.   A. C. SAMES   2,253,814
PHOTOGRAPH MOUNT
Filed April 13, 1939

INVENTOR
August C. Sames
BY Eric Schinger
ATTORNEY

Patented Aug. 26, 1941

2,253,814

UNITED STATES PATENT OFFICE 2,253,814

PHOTOGRAPH MOUNT

August C. Sames, Rochester, N. Y., assignor to J. S. Graham Company, Inc., Rochester, N. Y., a corporation of New York Application April 13, 1939, Serial No. 267,669

2 Claims. (Cl. 40—159)

This invention relates to picture mounts and has for its object to provide the mask of the mount with a cut-out underlay in combination with a transverse substantially invisible cut in the back of the mount located within the cut-out portion of the underlay and intermediate an outer edge of the back and an inner edge of the mask so that the abutting edges of the cut may be forced out of alignment to form a slit in the back of the mount leading into the cut-out portion of the underlay under the mask to provide a quick and easy way of inserting a picture into the mount and then have the edges of the cut realign themselves to close the slit and lock the inserted picture into the mount without the aid of adhesives.

This and other objects and attendant advantages of the invention will become more readily apparent from the detailed description thereof which follows, reference being had to the accompanying drawing in which Figure 1 is a perspective front elevation of the mount embodying my invention.

Figure 1:
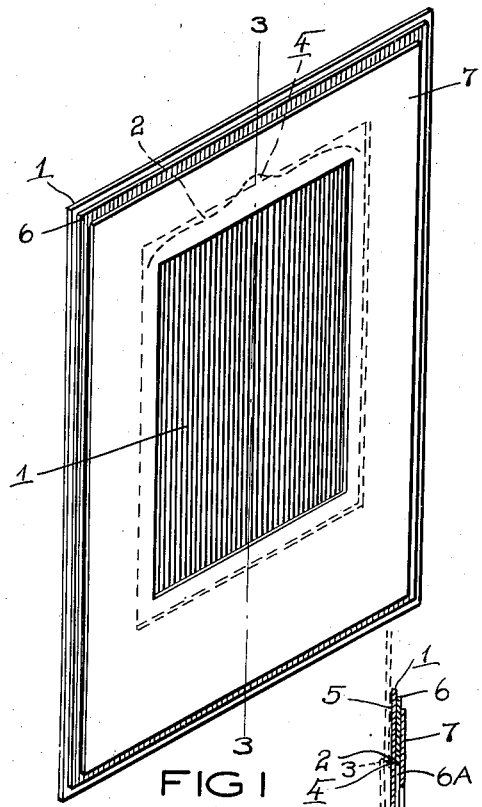

The picture mount embodying the subject matter of the present invention is especially adapted for use by photographers and provides an adjustable, quick, easy and at the same time permanent mounting for photographs without the aid of adhesives.

As illustrated in the figures of the drawing, the mount comprises a back 1 which is provided with a transverse substantially invisible cut 2. This cut is shaped so as to form a short tongue 3 having a central tip 4 in the back of the mount. This tongue is spaced from the outer edge of the back to provide a guide area 5 between it and the tongue against which the picture is held while it is being inserted into the mount in the manner that will presently appear.

Attached to the face of the back is the cut-out underlay 6 so as to provide a recess 6A surrounded on all sides by a continuous edge on the face of the back. Attached to the underlay is the cut-out mask 7. The recess provided by the underlay 6 is larger in width and length than the picture to be mounted in order to permit a limited adjustment of the picture within this recess.

Figures 3, 5:
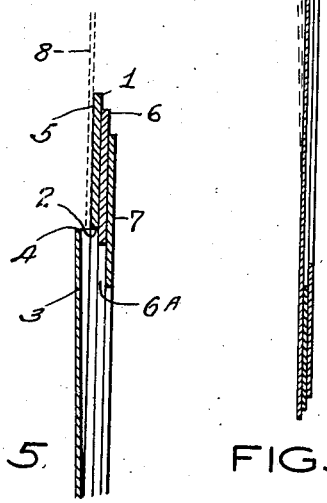
Figure 3 is a vertical sectional view taken on the line 3—3 of Figure 1.
Figure 5 is an enlarged vertical sectional view of the upper portion of the mount.

The transverse cut 2 in the back of the mount is located at or near the top of the cut-out portion in the underlay 6 so that when abutting edges of the transverse cut are forced out of alignment by pressure exerted thru the mask, the tongue 3 angularly projects from the back as illustrated in dotted lines in Figure 5 and provides a slit between it and the back member thru which the edge of a picture may be inserted into the cut-out portion of the underlay from the rear of the mount.

Figure 2:
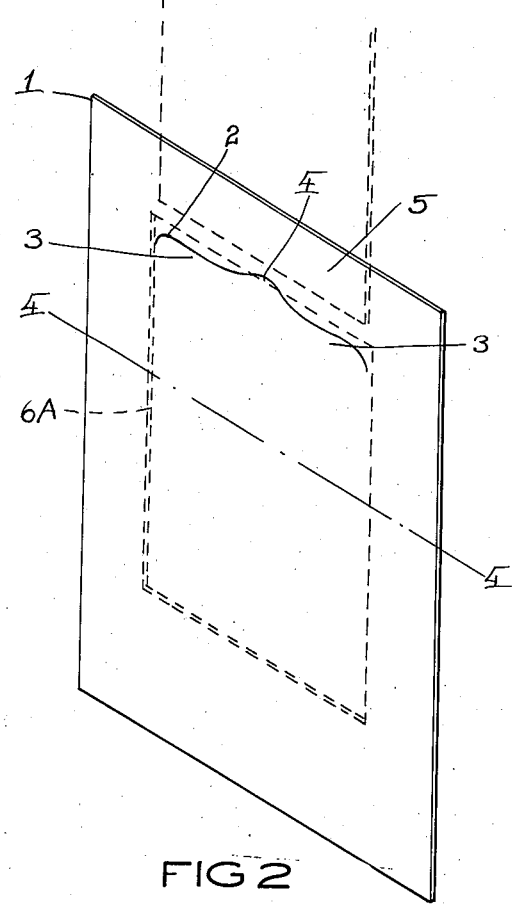
Figure 2 is a perspective rear elevation thereof.
Figure 4:
Figure 4 is a horizontal sectional view taken on the line 4—4 of Figure 2.

The guide area 5 above the transverse slit is adapted to support and line up the edge of the picture indicated by reference numeral 8 in Figures 2, 3 and 4 for insertion into the slit and by holding the picture against this area while it is being inserted it is flattened and held in parallel alignment with the slit for easy and quick insertion and kept from buckling during the insertion.

As will be noted from an inspection of Figures 1 and 3 that while the transverse cut 2 is located substantially within the recess formed by the underlay and slightly spaced from the inner edge to permit the ready insertion of the entire picture into this recess, the central tip thereof slightly overlaps the inner edge of the underlay to keep the central tip of the tongue formed by the transverse cut from being forced into the recess against the back of the picture after it is inserted into the mount. This prevents the tongue from interfering with the adjustment of the picture in the mount after it is inserted and at the same time brings the edges of the cut again in perfect alignment to close the slit when the tongue is forced back after the insertion of the picture. The picture is thus permanently locked in place in the mount.

The transverse cut 2 in the back of the mount is curved as illustrated in order to form a tongue with a central tip which facilitates the insertion of the picture by engaging the middle of its bottom edge first to start and guide its insertion.

After the picture is inserted and the slit is closed as above described, the back of the mount will again have its original appearance which is not marred by an irregular formation or unsightly opening heretofore necessary in mounts of this kind.

Photographic prints when finished are slightly concaved either longitudinally or transversely. This gives the picture sufficient spring action so that when it is partially straightened by the insertion into the recess 6A, the spring action of the picture causes its edge portions to yieldingly engage the face of the back and the underside of the mask within the recess provided by the underlay 6. The print or picture is thus frictionally held in place between the mask and the back of the mount and can only be displaced by force within the confines of the recess for the adjustment thereof.

From the foregoing it will be apparent that I have devised a new and useful mount for photographs or other pictures which embodies the features and advantages enumerated as desirable in the statement of the invention and the above description, and while I have, in the present instance, shown and described a preferred embodiment thereof which gives satisfactory and reliable results, it is understood that this embodiment is susceptible of modification without departing from the spirit or scope of the invention or sacrificing any of its advantages, and I consider that I am at liberty to make such changes and alterations as fairly come within the scope of the appended claims.

I claim:

1. In a picture mount the combination of a back, a cut-out underlay attached to said back to form a recess surrounded by a continuous edge on one side of the back, a cut-out mask attached to said underlay with the edges of the portion overhanging the edges of said recess, said back having a substantially transverse cut forming a yielding tongue located partially within and partially without the recess in the back along one edge of the recess so that said tongue permanently overlaps the underside of said underlay and is held against movement into the recess and may be forced outwardly of the back and provide a slit over a portion of the underlay into the recess with a guiding and supporting area on the underside of the back adjacent the edges of the tongue and between the slit and the outer edge of the back.

2. In a picture mount the combination of a back, a cut-out underlay attached to said back to form a recess surrounded by a continuous edge on one side of the back, a cut-out mask attached to said underlay with the edges of the cut-out portion overhanging the edges of said recess, said back being cut transversely to form a yielding tongue in the back within said recess near one edge thereof with an extension tip on said tongue so as to permanently overlap the under side of said underlay and keep said tongue from extending into said recess, said tongue being adapted to be forced outwardly of the back to provide a slit leading into the recess with a guiding and supporting area on the under side of the back between the slit and the outer edge of the back.

AUGUST C. SAMES.